July 27, 1926.  
G. JOHNSON  
LAND LEVELER AND PACKER  
Filed Jan. 9, 1926
1,594,265
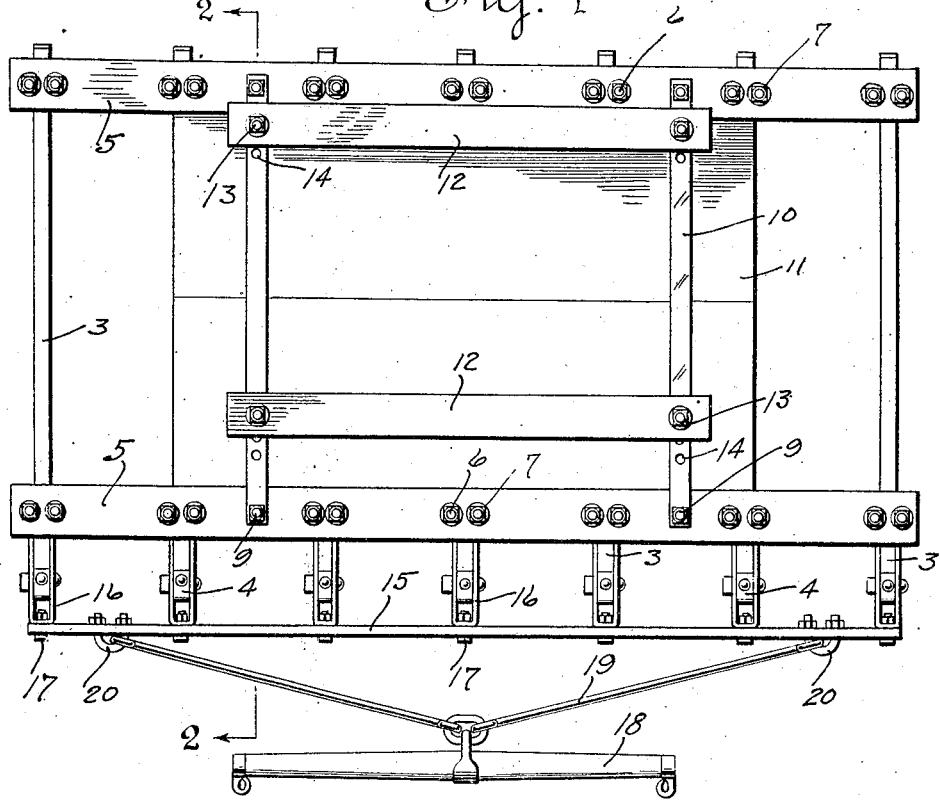
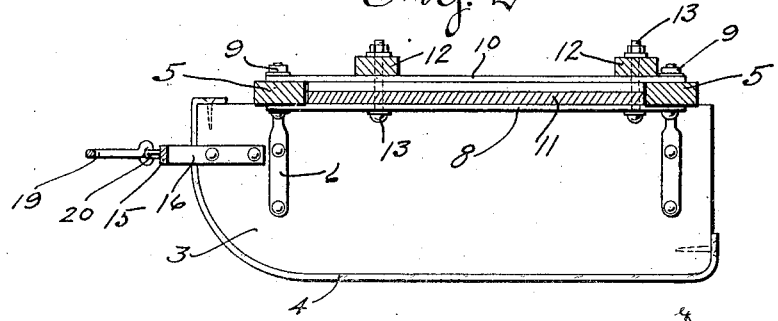
Inventor  
Gust Johnson Patented July 27, 1926.

1,594,265

UNITED STATES PATENT OFFICE.

GUST JOHNSON, OF ORRIN, NORTH DAKOTA.

LAND LEVELER AND PACKER.

Application filed January 9, 1926. Serial No. 80,374.

My invention has for its object to provide an extremely simple and highly efficient land leveler and packer intended for use in preparing seed beds, and it is especially adapted for use in preparing sandy soil.

To the above end, the invention consists of the novel devices and combinations of devices hereinafter described and defined in the claims.

In the accompanying drawings, which illustrate the invention, like characters indicate like parts throughout the several views.

Referring to the drawings:

Fig. 1 is a plan view of the invention; and

Fig. 2 is a vertical section taken on the line 2—2 of Fig. 1.

The numeral 3 indicates a plurality of laterally spaced runners having curved front ends and metallic shoes 4. These runners 3 are rigidly connected by front and rear crosstie bars 5. As one means of rigidly securing the runners 3 to the crosstie bars 5, there is riveted or bolted to opposite sides of each runner pairs of upwardly projecting metal straps 6 the upper end portions of which extend through bores in the crosstie bars 5 and have nuts 7 applied thereto.

The crosstie bars 5 are connected by a pair of edgewise spaced lower metal bars 8 that are secured to the under sides of said crosstie bars by nut-equipped bolts 9. Upper metal bars 10 extend longitudinally over the lower bars 8 and are secured on top of the crosstie bars 5 by the bolts 9. A platform 11 is supported on the lower bars 8 and the purpose of this platform is to carry a weight such as a bag of sand, not shown, to give the required pressure to the runners 3 to level and pack the soil. Such a weight is adapted to be placed on the platform 11 between the upper bars 10 which hold the same against sidewise shifting movement. Said weight is also held against either forward or backward movement on the platform 11 by front and rear retaining bars 12, the end portions of which are supported on the upper bars 10 and adjustably secured thereto by nut-equipped bolts 13 adapted to be inserted through certain of a plurality of longitudinally spaced bores 14 in the lower bars 8, platform 11 and upper bars 10. By adjusting the retaining bars 12 on the upper bars 10 the position of the weight may be shifted, at will, to vary the pressure lengthwise on the runners 3.

A draft bar 15 is secured to the front ends of the runners 3 by U-shaped members 16 that embrace said runners and are riveted or bolted thereto and the draft bar 15 is connected to the intermediate portions of said members by nut-equipped bolts 17. A singletree 18 is connected to the draft bar 15 by a pair of diverging links 19 secured to said draft bar by U-bolts 20.

The closely positioned runners 3 will push the soil in front thereof and fill in the holes and level the ground after plowing and at the same time crush the clogs or lumps. Said runners 3 will also pack the soil as well as level it to form a seed bed.

The above described device will level and pack the soil sufficiently to make a good seed bed, but will not make it so smooth as to cause drifting of a light soil.

By the use of the improved land leveler and packer soil may be prepared for seed beds as the same is plowed or soon thereafter.

The above described device has in actual practice proven highly efficient for the purpose had in view.

The device, which has been actually used, has the following dimensions: The runners 3 at the top are substantially two and one-half feet in length, and the land-engaging surface of the bottom of the shoe 4 is substantially eighteen inches in length. The height or width of the runner is approximately ten inches and the space between centers of adjacent runners is substantially seven inches. The thickness of the runner is substantially one inch. The overall width of the device is substantially forty-three inches.

By practice these dimensions have given good results.

The right is reserved to use the proper size of runners, properly spaced apart, and of the proper width or thickness and I do not, therefore, limit myself to the exact size and proportion shown and described herein. I ask especially for this right to vary the sizes of the runners, and to vary the width between the runners, to meet conditions of different kinds of land.

What I claim is:

1. A land leveler and packer comprising a plurality of laterally spaced runners having curved front ends, a draft bar rigidly secured to the front ends of the runners, front and rear crosstie bars rigidly connecting the runners, a pair of edgewise spaced lower bars having their ends secured to the under sides of the crosstie bars, an upper pair of bars secured to the crosstie bars over said lower bars, a platform between said upper and lower bars, and front and rear retaining bars secured on said upper bars.

2. The structure defined in claim 1 in which the front and rear retaining bars are adjustable toward and from each other.

In testimony whereof I affix my signature.

GUST JOHNSON.